(12) United States Patent
Deshmukh et al.

(10) Patent No.: US 11,521,247 B2
(45) Date of Patent: Dec. 6, 2022

(54) DETERMINING A CRITICALITY OF AN INVOICE, AND PRESENTING INFORMATION RELATED THERETO ON A GRAPHICAL USER INTERFACE

(71) Applicant: Oracle International Corporation, Redwood Shores, CA (US)

(72) Inventors: Madhulika Deshmukh, Tamil Nadu (IN); Narayana Rao Palukuri, Hyderabad (IN); Milan Bharat Parikh, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 313 days.

(21) Appl. No.: 16/253,968

(22) Filed: Jan. 22, 2019

(65) Prior Publication Data

US 2020/0234349 A1 Jul. 23, 2020

(51) Int. Cl.
*G06Q 30/04* (2012.01)
*G06F 3/0484* (2022.01)
*G06F 3/0482* (2013.01)

(52) U.S. Cl.
CPC ........... *G06Q 30/04* (2013.01); *G06F 3/0482* (2013.01); *G06F 3/0484* (2013.01)

(58) Field of Classification Search
CPC ...... G06Q 30/04; G06F 3/0484; G06F 3/0482
See application file for complete search history.

(56) References Cited

U.S. PATENT DOCUMENTS 8,065,202 B1 * 11/2011 Ballaro .............. G06Q 30/0643
  705/27.2
8,285,573 B1 * 10/2012 Ballaro ................ G06Q 10/087
  705/7.11

(Continued)

FOREIGN PATENT DOCUMENTS

WO  WO-2018039286 A1 *  3/2018 ......... G06Q 20/4014

OTHER PUBLICATIONS

Mohammad Aman Ullah, Predicting Default Payment of Credit Card Users: Applying Data Mining Techniques, Oct. 1, 2018, 2018 International Conference on Innovations in Science, Engineering and Technology (ICISET), pp. 355-360 (Year: 2018).*

(Continued)

*Primary Examiner* — Sangeeta Bahl
*Assistant Examiner* — Aaron N Tutor
(74) *Attorney, Agent, or Firm* — Invoke

(57) ABSTRACT

Techniques for determining and presenting invoice criticality information for an invoice on a graphical user interface (GUI) are disclosed. Invoice criticality represents an urgency and/or significance associated with an invoice. An urgency is determined based on a difference between (a) a predicted amount of time for completing processing of the invoice and (b) an amount of time currently remaining until the target completion date. A significance is determined based on a predicted impact level resulting from missing a target completion date for the invoice. A GUI displays invoice criticality information associated with one or more invoices. The GUI presents a suggested action for resolving a predicted hold for a particular invoice. The GUI presents a suggested action based on a current and/or impending processing stage for a particular invoice. The GUI presents correlation information indicating relationships between (Continued)

invoice characteristics, processing times, and/or impact levels.

17 Claims, 10 Drawing Sheets

(56) References Cited

U.S. PATENT DOCUMENTS

| | | | |
|---|---|---|---|
| 8,694,429 B1* | 4/2014 | Ballaro | G06Q 30/0633 |
| | | | 705/40 |
| 2018/0096311 A1* | 4/2018 | Sarir | G06Q 20/102 |
| 2018/0158116 A1* | 6/2018 | Hoang | G06Q 20/00 |
| 2020/0226503 A1* | 7/2020 | Subramanian | G06Q 30/04 |

OTHER PUBLICATIONS

Alim et al., Oracle Financials Cloud, Using Payables Invoice to Pay, Release 13 (update 18A), Part No. E92170-03, 57 pages, 2018.

Streamlining the processing of all your invoices, SAP Ariba Invoice Management, 10 pages, 2016.

Mungurwadi, A Machine Learning Approach for Cash Flow Prediction, http://blog.ekaplus.com/blog/a-machine-learning-approach-for-cash-flow-prediction, 8 pages, 2015.

Accounts Payables Analytics—Visual BI Solutions, http://visualbi.com/analytics/accounts-payables/, 4 pages, Retrieved on May 22, 2018.

\* cited by examiner

Screenshot 700

Invoice # 12345

Amount Due: 90.00

Currency: USD

Supplier: Fishers

Supplier Location: Canada

Creation Date: 1/1/2018

Last Updated Date: 2/1/2018

Business Unit: Prepared Foods

PO #: 2354

Basic Information 718

Element 702
Element 704
Element 706
Element 708
Element 710
Element 712

| Line # | Item | Unit Price | Units | Total | Description |
|---|---|---|---|---|---|
| 1 | Tuna | 2.31 | 7 | 16.17 | Pacific tuna |
| 2 | Salmon | 3.12 | 8 | 24.96 | Farm-raised salmon |
| 3 | Oysters | 3.55 | 4 | 14.2 | -- |

Table 716

Stages

Validation: Done
Approval: 1 missing
Paid: Not paid

Holds

Resolved Holds: 2
Pending Holds: 0
Predicted Holds: 1

Criticality

Criticality Category: High
Predicted Processing Time: 2 days
Due Date: 3/1/2018

Status Pane 714

Fig. 7

DETERMINING A CRITICALITY OF AN INVOICE, AND PRESENTING INFORMATION RELATED THERETO ON A GRAPHICAL USER INTERFACE

TECHNICAL FIELD

The present disclosure relates to invoice management software, and a graphical user interface (GUI) thereof. In particular, the present disclosure relates to determining a criticality of an invoice, and presenting information related thereto on a graphical user interface.

BACKGROUND

Invoice management software is configured to manage processing of invoices received by an organization. Processing invoices may include receiving invoices, obtaining approvals for invoices, and making payment on invoices. As an example, invoice management software may sort invoices by due date. The invoice management software may present, at a graphical user interface (GUI), a list of pending invoices ordered by due date. As another example, invoice management software may determine a problem associated with a particular invoice. The invoice management software may present, at a GUI, the problem associated with the particular invoice.

However, the invoice management software does not provide a user sufficient information for prioritizing processing of a set of invoices based on predicted processing times for the invoices. The invoice management software does not provide a user sufficient information for prioritizing processing of a set of invoices based on predicted impact levels to the organization resulting from delinquent payment of the invoices.

As an example, a hospital may receive an invoice for medication and an invoice for office supplies. The medication invoice may be due in two weeks, and the office supplies invoice may be due in three days. An invoice management software may present a list of pending invoices ordered by due date. Based on the due dates, processing of the office supplies invoice may appear to take priority over processing of the medication invoice. However, a myriad of factors may affect which invoice should take priority. The medication invoice may require more approvals. The medication supplier may withhold further shipment of medication if payment on the medication invoice is delinquent. The medication supplier may be the only entity that supplies a particular type of medication. Therefore, the ordering based on due date does not necessarily reflect the priority in which the invoices should be processed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 illustrates an example graphical user interface indicating a status associated with a particular invoice, in accordance with one or more embodiments;

DETAILED DESCRIPTION

Figure 1:
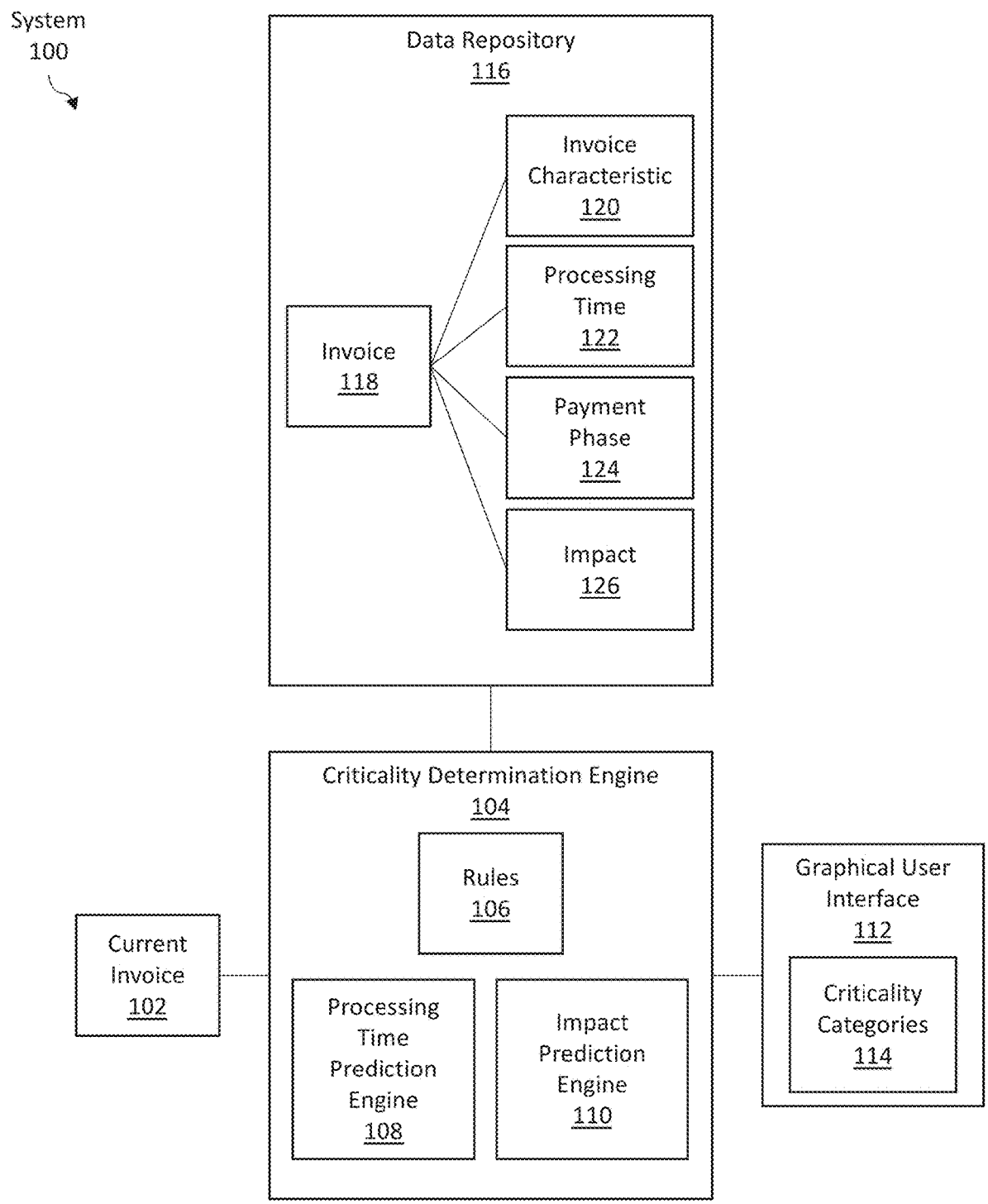
FIG. 1 illustrates an invoice management system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. INVOICE MANAGEMENT ARCHITECTURE
3. GENERATING A SET OF RULES FOR DETERMINING A PREDICTED PROCESSING TIME
4. GENERATING A SET OF RULES FOR DETERMINING A PREDICTED IMPACT
5. DETERMINING INVOICE CRITICALITY
6. PRESENTING, AT A GRAPHICAL USER INTERFACE (GUI), CRITICALITY INFORMATION FOR ONE OR MORE INVOICES
7. EXAMPLE GRAPHICAL USER INTERFACES
8. HARDWARE OVERVIEW
9. MISCELLANEOUS; EXTENSIONS

1. General Overview

One or more embodiments determine invoice criticality. Invoice criticality reflects an urgency associated with processing an invoice in order to meet a target completion date. An urgency is determined based on a difference between (a) a predicted amount of time for completing processing of the invoice and (b) an amount of time currently remaining until the target completion date. A difference between (a) a predicted amount of time for completing processing of the invoice and (b) an amount of time currently remaining until the target completion date may also be referred to herein as a "processing time margin." A predicted processing time may be a sum of predicted processing times for each processing stage of an invoice. A predicted processing time for a particular processing stage of a current invoice may be determined based on historical processing times for the particular processing stage for invoices with similar characteristics as the current invoice.

In one or more embodiments, invoice criticality further reflects a significance associated with meeting a target completion date for an invoice. A significance is determined based on a predicted impact, to an organization, resulting from missing the target completion date. A predicted impact may include, for example, a loss in discounts for timely invoice payment, a late charge, an interest charge, and a loss of a supplier. A predicted impact associated with a current invoice may be determined based on historical impact associated with invoices with similar characteristics as the current invoice.

One or more embodiments include presenting, on a graphical user interface (GUI), information indicating an invoice criticality for an invoice. A GUI displays interface elements representing various criticality categories. The interface elements are selectable to request additional information associated with the corresponding criticality category. The additional information may be, for example, a list of invoices within the selected criticality category. Additionally or alternatively, the GUI may display a suggested action for an invoice to prioritize processing of the invoice. The suggested action may be aimed at reducing a processing time for the invoice. Additionally or alternatively, the GUI may display correlation information indicating relationships between invoice characteristics, processing times, and/or impact levels.

Without invoice criticality information displayed on a GUI, a user may prioritize processing of invoices based on due dates of the invoices. However, with invoice criticality information displayed on a GUI, a user can easily prioritize processing of the invoices based on the urgency and/or significance associated with the invoices.

As an example, an organization receives an invoice from Supplier Fastco and an invoice from Supplier Hurrico. The Fastco invoice may be due in 4 days. The Hurrico invoice may be due in 7 days.

First, urgency levels associated with the invoices may be analyzed. A predicted processing time for the Fastco invoice may be 1 day. A predicted processing time for the Hurrico invoice may be 6 days. Therefore, processing of the Hurrico invoice is more urgent than processing of the Fastco invoice.

Second, significance levels associated with the invoices may be analyzed, Supplier Hurrico has a history of withholding future shipment of supplies if there is a missed due date. Supplier Fastco has a history of not penalizing the organization even if there is a missed due date. Therefore, meeting the target completion date of the Hurrico invoice is more important than meeting the target completion date of the Fastco invoice.

Based on the urgency and significance determined above, an invoice criticality for the Hurrico invoice may be greater than an invoice criticality for the Fastco invoice. A GUI may display information indicating that the Hurrico invoice is more critical than the Fastco invoice. Based on the information on the GUI, the organization may prioritize processing of the Hurrico invoice over that of the Fastco invoice.

One or more embodiments described in this Specification and/or recited in the claims may not be included in this General Overview section.

2. Invoice Management Architecture

FIG. 1 illustrates an invoice management system, in accordance with one or more embodiments. As illustrated in FIG. 1, a system 100 includes a current invoice 102, a criticality determination engine 104, a data repository 116, and a graphical user interface (GUI) 112. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a data repository 116 is any type of storage unit and/or device (e.g., a file system, database, collection of tables, or any other storage mechanism) for storing data. Further, a data repository 116 may include multiple different storage units and/or devices. The multiple different storage units and/or devices may or may not be of the same type or located at the same physical site. Further, a data repository 116 may be implemented or executed on the same computing system as a criticality determination engine 104 and/or GUI 112. Alternatively or additionally, a data repository 116 may be implemented or executed on a computing system separate from a criticality determination engine 104 and/or GUI 112. The data repository 112 may be communicatively coupled to the criticality determination engine 104 and/or GUI 112 via a direct connection or via a network.

Information describing an invoice 118, an invoice characteristic 120, a processing time 122, a payment phase 124, and an impact 126 may be implemented across any of components within the system 100. However, this information is illustrated within the data repository 116 for purposes of clarity and explanation.

In one or more embodiments, an invoice 118 is a statement of an amount due for one or more items (goods and/or services) sold (or to be sold) by a supplier. An invoice may but does not necessarily include a list of items sold (or to be sold) and/or a price for each item.

An invoice 118 includes one or more term dates. A term date is a date by which a supplier expects and/or desires payment. Examples of term dates include discount date, due date, and penalty date. A due date is a date by which payment should be made to a supplier. A discount is offered for early payment before a discount date. A penalty is charged for late payment after a penalty date. As an example, an invoice may have a discount date of January 15, a due date of February 1, a 10% penalty date of February 8, and a 15% penalty date of February 15. The discount date, due date, 10% penalty date, and 15% penalty date may each be referred to as a "term date."

In one or more embodiments, an invoice characteristic 120 is a characteristic associated with an invoice 118. Various invoice characteristics 120 may be used.

An invoice characteristic 120 may be but is not necessarily stated on an invoice 118. Examples of invoice characteristics 120 stated on an invoice 118 include an amount due, a currency type associated with the amount due, a supplier, an item sold (or to be sold), whether the invoice 118 is matched with a purchase order, an identifier of a matching purchase order, a discount for early payment, and a penalty for late payment. An invoice that is matched with a purchase order may be referred to herein as a "matched invoice"; an invoice that is not matched with a purchase order may be referred to herein as an "unmatched invoice."

An invoice characteristic 120 may be determined by analyzing information stated on an invoice 118. Examples of invoice characteristics 120 determined by analyzing information stated on an invoice 118 include a supplier type of a supplier, and an item type of an item sold (or to be sold). Examples of supplier types include suppliers that are sensitive to delinquent payment, suppliers that are not sensitive to delinquent payment, local suppliers, overseas suppliers, suppliers of critical supplies to an organization, suppliers of non-critical supplies to an organization, a repeating supplier, and a one-time supplier. Examples of item types include items that constitute critical supplies to an organization, items that constitute non-critical supplies to an organization, items sold locally, items sold overseas, items needed on a repeating basis, and items needed on a one-time basis.

An invoice characteristic 120 may be associated with a way in which an invoice 118 is processed. A way in which an invoice 118 is processed may be determined based on other invoice characteristics 120 of the invoice 118. Examples of invoice characteristics 120 associated with a way in which an invoice 118 is processed include an identity of an entry clerk for entering the invoice into an invoice management system, a number of approvers required for proceeding with payment, an identity of an approver, whether a supplier penalizes for delinquent payment (in terms of penalty fees, withheld future shipments, or otherwise), a number of holds issued for an invoice, a hold type of a hold issued for an invoice, and an action performed to resolve a hold for an invoice. Additionally or alternatively, invoice characteristics 120 may include various dates of actions involved in processing the invoice 118, such as a date on which an invoice was issued by a supplier, a date on which an invoice was entered into an invoice management system, a date on which an invoice was validated, a date on which an approver provided approval, and a date on which payment was submitted by the organization. Invoice characteristics 120 may include dates on which various processing stages began, such as a dates indicating the beginning of each of a validation stage, an approval stage, and a payment stage.

Other examples of invoice characteristics 120 may include an identity of a department or employee that initiated a purchase resulting in an invoice 118, a deposit already submitted for an amount due on an invoice 118, and a method of submitting a purchase request to the supplier. Additionally or alternatively, an invoice characteristic 120 may be specified by a user processing an invoice 118. As an example, John may be an accounts payable manager of an organization. John may process a particular invoice from Supplier Friendly. John may be good friends with the owner, Mary, of Supplier Friendly. Based on the friendship, John may mark the particular invoice with the invoice characteristic, "Important Supplier." However, other employees of the organization, who may also handle invoices from Supplier Friendly, do not necessarily treat invoices from Supplier Friendly in the same way.

In one or more embodiments, a processing time 122 is an amount of time used for completing a particular processing stage for an invoice. Additionally or alternatively, a processing time 122 is a total amount of time used for completing all processing for an invoice. Examples of processing stages include a validation stage, an approval stage, and a payment stage.

In a validation stage, an invoice 118 is entered into an invoice management system. Various validations are performed. The invoice 118 may be validated for line variances and/or distribution variances. The invoice 118 may be validated for discrepancies with a matching purchase order (if any). The invoice 118 may be validated for accuracy of shipment address, billing address, items sold, and/or deposits already submitted.

In an approval stage, an invoice 118 is submitted to approvers for approval. A number and/or identity of approvers for an invoice 118 may be dependent upon an invoice characteristic 120 of the invoice 118. An invoice 118 may be simultaneously submitted to multiple approvers for approval. Additionally or alternatively, an invoice 118 may be sequentially submitted to each approver in an approval chain, such that a particular approver does not receive the invoice 118 for review until a previous approver has approved the invoice 118.

In a payment stage, payment for an invoice 118 is prepared and submitted to the supplier. Preparing for payment may include transferring funds between bank accounts, transferring funds between departments within an organization, and/or converting funds from one currency into another currency. After funds transferred from an organization, the funds may be but are not necessarily immediately received by the supplier. For example, the funds may be withheld by a financial institution for a period of time before being deposited to the supplier.

In one or more embodiments, a payment phase 124 of an invoice 118 indicates what term dates of the invoice 118 were missed and what term dates of the invoice 118 were satisfied at the time of payment for the invoice 118. Examples of payment phases may include "Before Discount Date," "Between Discount Date and Due Date," "Between Due Date and Penalty Date," and "After Penalty Date." As an example, an invoice may have a discount date of January 1, a due date of January 15, and a penalty date of February 15. Payment for the invoice may be completed on January 31. Therefore, the payment phase associated with the invoice may be "Between Due Date and Penalty Date."

In one or more embodiments, an impact 126 associated with an invoice 118 indicates a loss or gain experienced by an organization due to payment of the invoice 118 during a certain payment phase 124. An impact 126 may be determined based on a monetary loss or gain, such as discounts earned, penalty fees incurred, or interest charges incurred. Additionally or alternatively, an impact 126 may be determined based on a non-monetary loss or gain, such as a delay in subsequent shipment of supplies, a loss of a supplier, or a loss of good will with a supplier.

In one or more embodiments, a current invoice 102 is an invoice to be processed. Payment for a current invoice 102 has not yet been submitted. A user may desire to determine invoice criticality information for a set of current invoices 102 in order to prioritize processing of the set of current invoice 102. Invoice criticality associated with an invoice 102 may include a criticality value of the invoice 102. Additionally or alternatively, invoice criticality associated with an invoice 102 may include a criticality category 114 of the invoice 102.

In one or more embodiments, an invoice criticality determination engine 104 refers to hardware and/or software configured to determine invoice criticality for a current invoice 102. An invoice criticality includes a criticality value and/or criticality category for a current invoice 102. An invoice criticality determination engine 104 includes a processing time prediction engine 108 and/or an impact prediction engine 110.

A processing time prediction engine 108 is configured to perform operations described herein for determining a predicted processing time for one or more processing stages for a current invoice 102. A processing time prediction engine 108 may determine a predicted processing time by applying rules 106 to invoice characteristics associated with a current invoice 102. Examples of operations for determining a predicted processing time are described below with reference to FIG. 4.

An impact prediction engine 110 is configured to perform operations described herein for determining a predicted impact resulting from missing a target completion date for a current invoice 102. An impact prediction engine 110 may determine a predicted impact by applying rules 106 to invoice characteristics associated with a current invoice 102. Examples of operations for determining a predicted impact are described below with reference to FIG. 4.

In one or more embodiments, an invoice criticality determination engine 104 generates rules 106 used for determining an invoice criticality for a current invoice 102. The rules 106 may be generated based on information associated with invoices 118 stored in a data repository 116. Examples of operations for generating rules 106 used for determining an invoice criticality are described below with reference to FIGS. 2 and 3.

In one or more embodiments, a GUI 112 refers to hardware and/or software configured to facilitate communications between a user and a criticality determination engine 104. A GUI 112 renders interface elements. A GUI 112 may provide information from a criticality determination engine 104 to a user using one or more interface elements. Additionally or alternatively, the GUI 112 may provide information from a user to a criticality determination engine 104 using one or more interface elements. Examples of interface elements include checkboxes, radio buttons, dropdown lists, list boxes, buttons, toggles, text fields, date and time selectors, command lines, sliders, pages, and forms. A GUI 112 may be implemented in conjunction with a command line interface (CLI), a haptic interface, a voice command interface, and/or other interfaces.

In one or more embodiments, a GUI 112 is configured to perform operations described herein for presenting information associated with one or more criticality categories 114. Examples of operations for presenting information associated with one or more criticality categories 114 are described below with reference to FIG. 5.

In an embodiment, an invoice criticality determination engine 104 and/or GUI 112 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

3. Generating a Set of Rules for Determining A Predicted Processing Time

Figure 2:
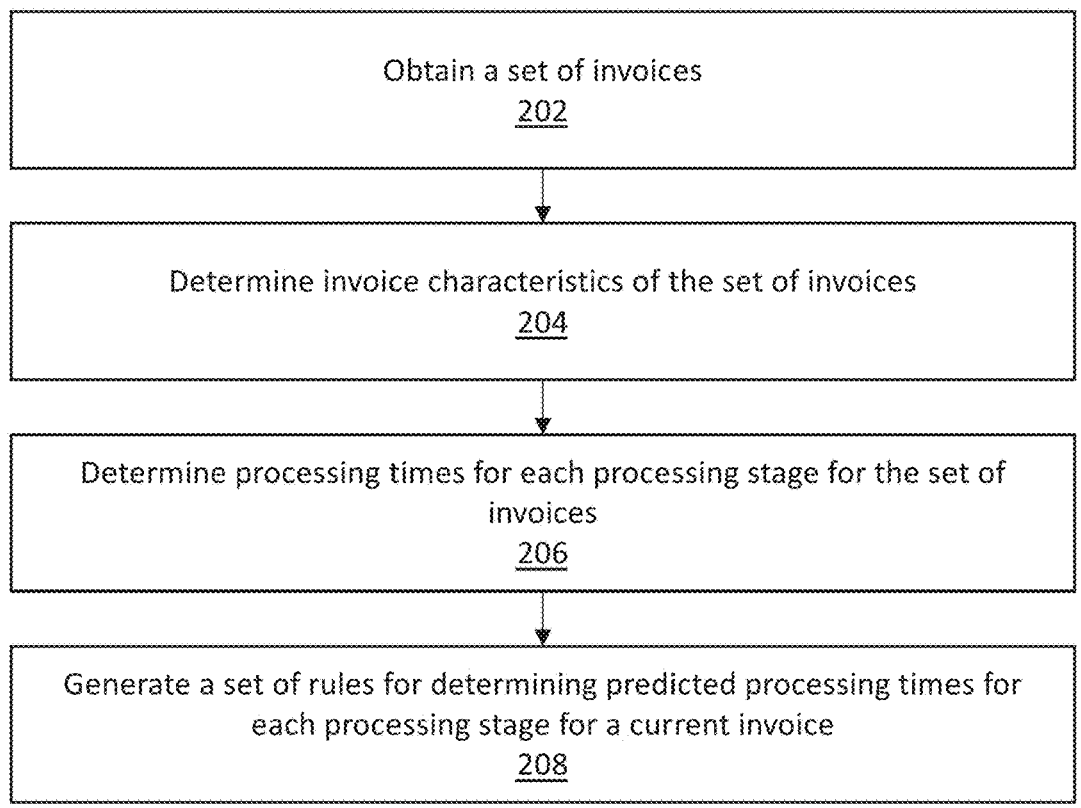
FIG. 2 illustrates an example set of operations for generating a set of rules for determining a predicted processing time for a processing stage for a current invoice, in accordance with one or more embodiments.

FIG. 2 illustrates an example set of operations for generating a set of rules for determining a predicted processing time for a processing stage for a current invoice, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include obtaining a set of invoices (Operation 202). An organization receives one or more physical invoices and/or electronic invoices. A physical invoice is scanned and stored into a data repository. Additionally or alternatively, an electronic invoice is stored into the data repository. An invoice management system obtains information associated with the set of invoices from the data repository. In an embodiment, the set of invoices have already been paid for, or are otherwise resolved.

One or more embodiments include determining invoice characteristics of the set of invoices (Operation 204). The system analyzes one or more scanned physical invoices and/or electronic invoices to determine invoice characteristics stated on the invoices. For a scanned physical invoice, the system performs optical character recognition (OCR) on the invoice. The system analyzes the OCR-ed data to determine an invoice characteristic stated on the invoice. For an electronic invoice, the system analyzes the fields within the electronic invoice. The system extracts information from the fields to determine an invoice characteristic stated on the invoice. Additionally or alternatively, the system otherwise analyzes the electronic invoice to determine an invoice characteristic stated on the invoice.

The system analyzes the invoice characteristics stated on the invoices to further determine additional invoice characteristics. As an example, an invoice may specify a particular supplier associated with the invoice. A system may identify the particular supplier based on the information stated on the invoice. The system obtain a set of mappings between suppliers and supplier types from a data repository. Based on the mappings, the system may determine a supplier type of the particular supplier.

The system analyzes processing histories of the set of invoices to determine invoice characteristics associated with ways in which the invoices were processed. A processing history of an invoice may be stored in any memory structure, such as a log or a database. A processing history may include, for example, a list of people that provided approval for an invoice, an amount of time used by each approver to approve an invoice, a list of holds that were issued for an invoice, a hold type of each hold issued for an invoice, an amount of time each hold was in place for an invoice, an action that was taken to resolve each hold for an invoice, a payment phase associated with an invoice, a discount that was provided for early payment, and/or a penalty that was charged for delinquent payment.

One or more embodiments include determining processing times for each processing stage for the set of invoices (Operation 206). The system obtains, from a data repository, information indicating the processing time for a particular processing stage for an invoice. As an example, a system obtains a date on which a validation stage began and a date on which an approval stage began. The system determines a processing time for the validation stage based on a difference between the two dates.

One or more embodiments include generating a set of rules for determining predicted processing times for each processing stage for a current invoice (Operation 208). The system conducts analysis for each processing stage separately. The system applies regression analysis, statistical analysis, machine learning algorithms, and/or other algorithms to the invoice characteristics, determined at Operation 204, and the processing times for a particular processing stage, determined at Operation 206. The system determines correlations and/or other relationships between the invoice characteristics and the processing times. Additionally or alternatively, the system determines correlations and/or other relationships within the invoice characteristics. The system iterates the analysis with respect to the processing times of each processing stage.

Based on the above analysis, the system generates a set of rules for determining predicted processing times for each processing stage for a current invoice. A set of rules specifies a predicted processing time, for a particular processing stage, for a current invoice as a function of invoice characteristics associated with the current invoice. The set of rules may be in the form of an artificial neural network (ANN), a decision tree, a formula, a weighted sum of input parameters, and/or other formats.

As an example, a data repository may store information for Invoices A-E. The information includes invoice characteristics and processing times per processing stage, as follows:
Invoice A; Supplier Fastco; amount due $500; validation stage 3 days; approval stage 5 days; payment stage 2 days
Invoice B; Supplier Fastco; amount due $100; validation stage 2 days; approval stage 2 days; payment stage 1 day
Invoice C; Supplier Fastco; amount due $600; validation stage 3 days; approval stage 6 days; payment stage 3 days
Invoice D; Supplier Hurrico; amount due $500; validation stage 3 days; approval stage 5 days; payment stage 2 days
Invoice E; Supplier Hurrico; amount due $200; validation stage 3 days; approval stage 5 days; payment stage 1 day A system may analyze each processing stage separately to determine a relationship between supplier, amount due, and processing time for the respective processing stage.

For the validation stage, the system may generate a set of rules indicating: the processing time for Fastco invoices increases as amount due increases; and the processing time for Hurrico invoices does not change based on amount due.

For the approval stage, the system may generate a set of rules indicating: the processing time for Fastco invoices increases as amount due increases; and the processing time for Hurrico invoices does not change based on amount due.

For the payment stage, the system may generate a set of rules indicating: the processing time for invoices from any supplier increases as amount due increases.

Hence, different rules may be generated for determining predicted processing times for different processing stages of a current invoice. Each rule may include a different set of input parameters, different weights applied to each input parameter, and/or different algorithms applied to the input parameters.

In an embodiment, the set of rules for determining a predicted processing time includes rules for predicting whether a hold of a particular hold type will be issued for the current invoice. Additionally or alternatively, the set of rules for determining a predicted processing time includes rules for predicting an amount of time that is necessary for resolving a predicted hold.

As an example, "More Info" may be a hold type of a hold that requests additional details about the items on an invoice.

A data repository may store information indicating that 90% of invoices that require John's approval are associated with a "More Info" hold. The information may further indicate that 5% of invoices that require Mary's approval are associated with a "More Info" hold. The information may further indicate that an average time used for resolving John's "More Info" hold is 4 days, and an average time used for resolving Mary's "More Info" hold is 3 days.

Based on the information stored in the data repository, a system may determine a correlation between the approver and a "More Info" hold. The system may generate a set of rules that indicates that an invoice requiring John's approval are more likely to be associated with a "More Info" hold than an invoice requiring Mary's approval. The set of rules may also indicate that a predicted amount of time needed for resolving John's "More Info" hold is 4 days, and a predicted amount of time needed for resolving Mary's "More Info" hold is 3 days. The system may determine a predicted processing time for an approval stage of a current invoice based on a probability that a "More Info" hold will be asserted on the current invoice. The system may determine the predicted processing time for the approval stage based further on a predicted amount of time necessary for resolving the "More Info" hold predicted for the current invoice.

4. Generating a Set of Rules for Determining A Predicted Impact

Figure 3:
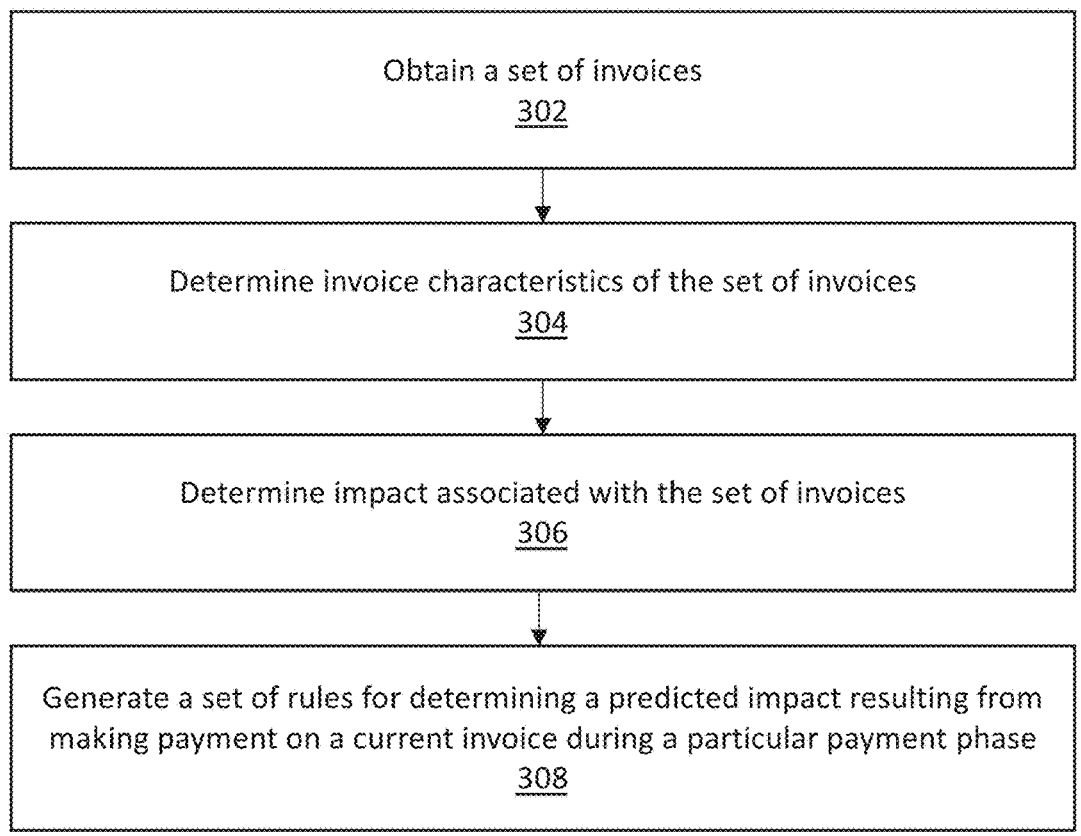
FIG. 3 illustrates an example set of operations for generating a set of rules for determining a predicted impact resulting from delinquent payment on a current invoice, in accordance with one or more embodiments.

FIG. 3 illustrates an example set of operations for generating a set of rules for determining a predicted impact resulting from delinquent payment on a current invoice, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include obtaining a set of invoices (Operation 302). Examples of operations for obtaining a set of invoices are described above with reference to Operation 202 of FIG. 2.

One or more embodiments include determining invoice characteristics of the set of invoices (Operation 304). Examples of operations for determining invoice characteristics of an invoice are above with reference to Operation 204 of FIG. 2. The invoice characteristics include a payment phase associated with each invoice.

One or more embodiments include determining impact associated with the set of invoices (Operation 306). The system obtains, from a data repository, information indicating a loss or gain experienced by the organization due to payment of an invoice during a certain payment phase. The system aggregates the losses and gains to determine an impact associated with the invoice.

As an example, an invoice may be associated with a due date of February 1 and a penalty date of February 15. A payment for the invoice may be made on February 16. A system may obtain, from a data repository, information indicating that a 10% penalty fee, in the amount of $1,000, was incurred. The system may also obtain information indicating that a 1% interest, in the amount of $100, was earned for keeping the funds in the organization's account from February 1 to February 16. Therefore, the system may compute that the aggregated losses and gains is 9%, or $900. The system may determine that an impact resulting from making payment during the "Between Due Date and Penalty Date" payment phase of the invoice is 9%, or $900.

One or more embodiments include generating a set of rules for determining a predicted impact resulting from making payment on a current invoice during a particular payment phase (Operation 308). The system applies regression analysis, statistical analysis, machine learning algorithms, and/or other algorithms to the invoice characteristics, determined at Operation 304 and the impact, determined at Operation 306. The system determines correlations and/or other relationships between the invoice characteristics and various levels of impact.

Based on the above analysis, the system generates a set of rules for determining a predicted impact resulting from making payment on a current invoice during a particular payment phase. The set of rules specifies a predicted impact for a current invoice as a function of invoice characteristics associated with the current invoice. The set of rules may be in the form of an artificial neural network (ANN), a decision tree, a formula, a weighted sum of input parameters, and/or other formats.

5. Determining Invoice Criticality

Figure 4:
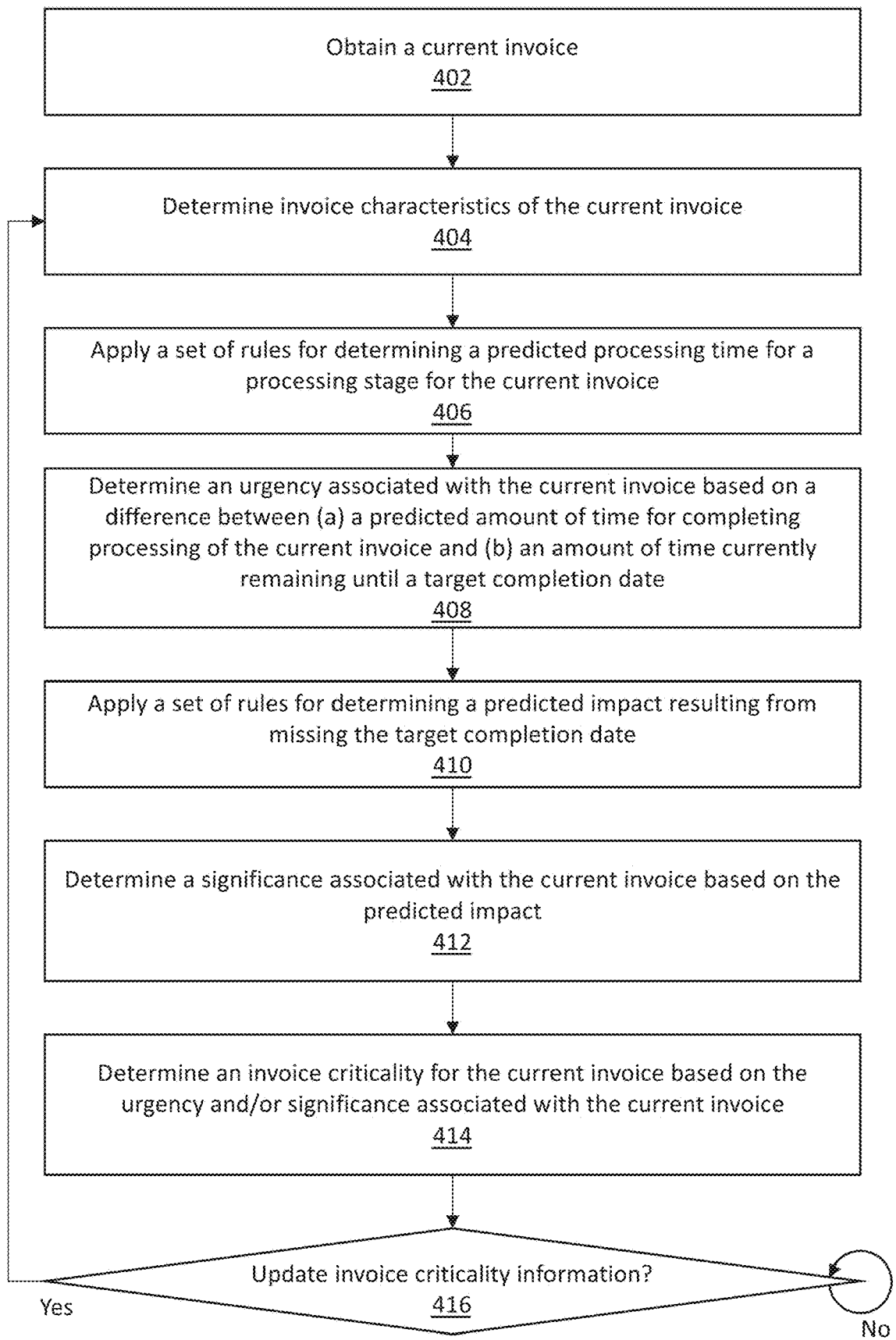
FIG. 4 illustrates an example set of operations for determining an invoice criticality for a current invoice, in accordance with one or more embodiments.

FIG. 4 illustrates an example set of operations for determining an invoice criticality for a current invoice, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include obtaining a current invoice (Operation 402). An invoice management system obtains a current invoice. The current invoice is pending and payment has not yet been made. The system is configured to determine an invoice criticality for the current invoice.

As an example, an invoice management system may receive a scanned physical invoice. As another example, an invoice management system may receive an electronic invoice.

One or more embodiments include determining invoice characteristics of the current invoice (Operation 404). Examples of operations for determining invoice characteristics of an invoice are above with reference to Operation 204 of FIG. 2.

One or more embodiments include applying a set of rules for determining a predicted processing time for a processing stage for the current invoice (Operation 406). The system determines a current processing stage for the current invoice. The system obtains a set of rules for determining a predicted processing time for the current processing stage. Additionally or alternatively, the system obtains a set of rules for determining a predicted processing time for each processing stage subsequent to the current processing stage. A processing stage subsequent to the current processing stage may be referred to herein as an "impending processing stage." Examples of operations for generating a set of rules for determining a predicted processing time are described above with reference to FIG. 2. The system applies each set of rules to the invoice characteristics of the current invoice to determine a predicted processing time for each corresponding processing stage.

As an example, a current invoice may currently be in an approval stage. The approval stage may be between a validation stage and a payment stage. A system may obtain (a) a set of rules for determining a predicted processing time for the approval stage and (b) a set of rules for determining a predicted processing time for the payment stage. The system does not obtain a set of rules for determining a predicted processing time for the validation stage.

Continuing the example, the system may determine inputs to the rules for determining a predicted processing time for the approval stage. The inputs may include: amount due, supplier type of supplier, and item type of item sold. The system may apply the rules to the inputs. Based on the rules, the system may map each of amount due, supplier, and item type to a respective intermediate score. Each intermediate score may reflect whether the corresponding characteristic is associated with longer or shorter processing times. Further based on the rules, the system may apply a respective weight to each intermediate score. Each weight may reflect how much the corresponding characteristic affects the processing time. The system may determine a predicted processing time based on a weighted sum of the intermediate scores.

Continuing the example, the system may determine inputs to the rules for determining a predicted processing time for the payment stage. The inputs may include: currency type, amount due, and supplier location. The system may apply the rules to the inputs. Based on the rules, the system may map each of currency type, amount due, and supplier location to a respective intermediate score. Further based on the rules, the system may apply a respective weight to each intermediate score. The system may determine a predicted processing time based on a weighted sum of the intermediate scores.

Additional and/or alternative ways of determining a predicted processing time may be used. For example, normalization, averages, and/or algorithms may be used.

In an embodiment, determining a predicted processing time for a processing stage includes (a) predicting whether a hold of a particular hold type that will be issued during the processing stage and (b) predicting an amount of time needed to resolve the predicted hold. The system incorporates the predicted amount of time needed to resolve the predicted hold into the predicted processing time for the particular processing stage.

One or more embodiments include determining an urgency associated with the current invoice based on a difference between (a) a predicted amount of time for completing processing of the invoice and (b) an amount of time currently remaining until a target completion date (Operation 408). The system computes a predicted amount of time for processing the current invoice by summing up the predicted processing times for each processing stage determined at Operation 406. The system also determines an upcoming term date associated with the current invoice as the target completion date for the current invoice.

The system determines a difference between (a) the predicted amount of time for completing processing of the current invoice and (b) the amount of time currently remaining until the target completion date. A difference between (a) a predicted amount of time for completing processing of the invoice and (b) an amount of time currently remaining until the target completion date may also be referred to herein as a "processing time margin." Based on the processing time margin, the system determines an urgency associated with processing the current invoice in order to meet the target completion date.

As an example, an urgency for an invoice is graded on a scale of 1 to 3. An urgency level of 3 may be associated with a processing time margin of 3 days or less. An urgency level of 2 may be associated with a processing time margin of 4 to 7 days. An urgency level of 1 may be associated with a processing time margin of more than 7 days.

Continuing the example, today may be January 15. A current invoice may be due on January 25. A predicted processing time for the current invoice may be 7 days. Hence, the processing time margin may be 3 days. Based on the above scoring system, the current invoice may be determined as being associated with an urgency level of 3.

One or more embodiments include applying a set of rules for determining a predicted impact resulting from missing the target completion date (Operation 410). The system identifies a set of rules for determining a predicted impact resulting from making payment on an invoice during a particular payment phase. Examples of operations for generating the set of rules are described above with reference to Operation 308 of FIG. 3.

The system applies the set of rules to determine a predicted impact resulting from making payment after the target completion date. The system also applies the set of rules to determine a predicted impact resulting from making payment before the target completion date.

The system determines a difference between (a) the predicted impact of making payment after the target completion date and (b) the predicted impact of making payment by the target completion date. The difference between the two levels of predicted impact is the relative impact resulting from missing the target completion date, as compared with paying before the target completion date.

As an example, a current invoice may be associated with the following term dates: due date January 15; 10% penalty date February 15; and 15% penalty date March 15. In addition, there may be a correlation between missing the 10% penalty date and a delayed subsequent shipment of goods.

Continuing the example, today may be March 1, which is between the 10% penalty date and the 15% penalty date. Hence, a target completion date (which is the upcoming term date) may be the 15% penalty date.

A system may apply a set of rules to determine a predicted impact resulting from making payment after the 15% penalty date. The predicted impact may include a 15% penalty and a delayed subsequent shipment of goods.

The system may apply the set of rules to determine a predicted impact resulting from making payment before the 15% penalty date. The predicted impact may include a 10% penalty and a delayed subsequent shipment of goods.

The system may determine a difference between the two predicted impact levels. The difference is a 5% penalty. Therefore, the system may determine that a predicted impact for missing the target completion date (that is, the 15% penalty date) is a 5% penalty.

One or more embodiments include determining a significance associated with the current invoice based on the predicted impact (Operation 412). The system aggregates (a) the predicted impact, determined at Operation 410, and (b) other characteristics of the current invoice that may affect the significance of the current invoice. Aggregation may involve applying different weights to the predicted impact level and scores representing the other characteristics of the current invoice. Additional and/or alternative ways for aggregating the predicted impact level and the other characteristics of the current invoice may be used. The aggregated result is determined as the significance associated with the current invoice.

As an example, John may enter user input indicating that any invoice that is from Supplier CandyCane and handled by John is considered "High Priority."

A system may obtain a current invoice. The current invoice may be issued from Supplier CandyCane. The current invoice may be assigned to John for processing.

A system may determine a predicted impact associated with the current invoice. The predicted impact level may be, for example, 15. The system may further determine that the current invoice is considered "High Priority," based on the user-specified characteristic entered by John. A score associated with the "High Priority" characteristic may be, for example, 10. (Meanwhile, if the current invoice were assigned to a different employee, the current invoice might not be associated with the "High Priority" characteristic.)

The system may aggregate the predicted impact and the "High Priority" characteristic, as follows 15+10=25. Therefore, the system may determine that a significance level associated with the current invoice is 25.

Examples of other characteristics of the current invoice that may affect the significance of the current invoice are described above with reference to FIG. 1.

One or more embodiments include determining an invoice criticality for the current invoice based on the urgency and/or significance associated with the current invoice (Operation 414). The system aggregates the urgency level, determined at Operation 408, and the significance level, determined at Operation 412. Aggregation may involve applying different weights to the urgency level and the significance level. As an example, applying a greater weight to an urgency level than a significance level reflects a user's desire to prioritize invoices that are urgent more than invoices that are important. As another example, applying a greater weight to a a significance level than an urgency level reflects a user's desire to prioritize invoices that are important more than invoices that are urgent. Additional and/or alternative ways for aggregating the urgency level and the significance level may be used. The aggregated result is determined as a criticality value for the current invoice.

The system obtains a set of mappings between criticality values and criticality categories. Each criticality category is mapped to a respective range of criticality values. Based on the mappings, the system determines a criticality category for the current invoice.

As an example, a system may determine that an urgency level for a current invoice is 5. The system may determine that a significance level for the current invoice is 10. The system may determine that an aggregated score, for the current invoice, is a sum of the urgency score and the significance score. Therefore, the system may determine that the current invoice is associated with a criticality value of 5+10=15.

Continuing the example, the system may identify the following criticality categories: "Low Criticality" includes criticality values below 10; "Medium Criticality" includes criticality values between 10 and 20; and "High Criticality" includes criticality values above 20. Therefore, the system may determine that the current invoice is associated with a criticality category of "Medium Criticality."

As another example, a system may determine that an urgency level for a current invoice is 5. The system may determine that a significance level for the current invoice is 10. The system may apply a weight of 0.6 to the urgency level. The system may apply a weight of 0.4 to the significance level. The system may determine a weighted sum, as follows 5×0.6+10×0.4=10. Therefore, the system may determine that the current invoice is associated with a criticality value of 10.

One or more embodiments include determining whether to update invoice criticality information for the current invoice (Operation 416). The system determines whether a criteria for determining updated invoice criticality information has been satisfied. Various criteria for determining updated invoice criticality information may be used.

In an embodiment, a criteria for determining updated invoice criticality information is completion of a current processing stage for the current invoice. Completion of a current processing stage triggers a need to determine updated invoice criticality information for the current invoice.

As an example, on March 1, a current invoice may be initially scanned into a system. The current invoice may be due on March 30. The system may determine the following predicted processing times:
Validation stage—4 days;
Approval stage—7 days;
Payment stage—3 days.

Hence, the total predicted processing time may be 4+7+3=14 days. The amount of time currently remaining until the due date may be 29 days (March 30–March 1). Therefore, the processing time margin may be 29−14=15 days. Based on the processing time margin of 15 days, the system may determine that a criticality value for the current invoice is 2.

The current invoice begins to be processed. Due to unexpected delays, the actual processing time for the validation stage may be 12 days. The validation stage for the current invoice may be completed on March 13. At the completion of the validation stage, an update of the criticality value is triggered. The system may determine the following predicted processing times:
Approval stage—7 days;
Payment stage—3 days.

Hence, the total remaining predicted processing time may be 7+3=10 days. The amount of time currently remaining until the due date may be 17 days (March 30–March 13). Therefore, the processing time margin may be 17−10=7 days. Based on the processing time margin of 7 days, the system may update a criticality value for the current invoice from 2 to 3.

In an embodiment, invoice criticality information for the current invoice is updated based on a periodic schedule. At the scheduled time, the system determines that a criteria for determining updated invoice criticality information is satisfied. The system then determines current invoice characteristics associated with the current invoice. The system applies the rules to the current invoice characteristics. The system hence determines updated invoice criticality information.

In an embodiment, current invoice criticality information for the current invoice is determined in response to a user request for invoice criticality information. As an example, a user may click an interface element, on a graphical user interface, requesting a list of invoices associated with a particular criticality category. In response to the user request, the system may determine current criticality values for all pending invoices. The system may then present, on the GUI, the invoices associated with the particular criticality category, based on the current criticality values.

Figure 5:
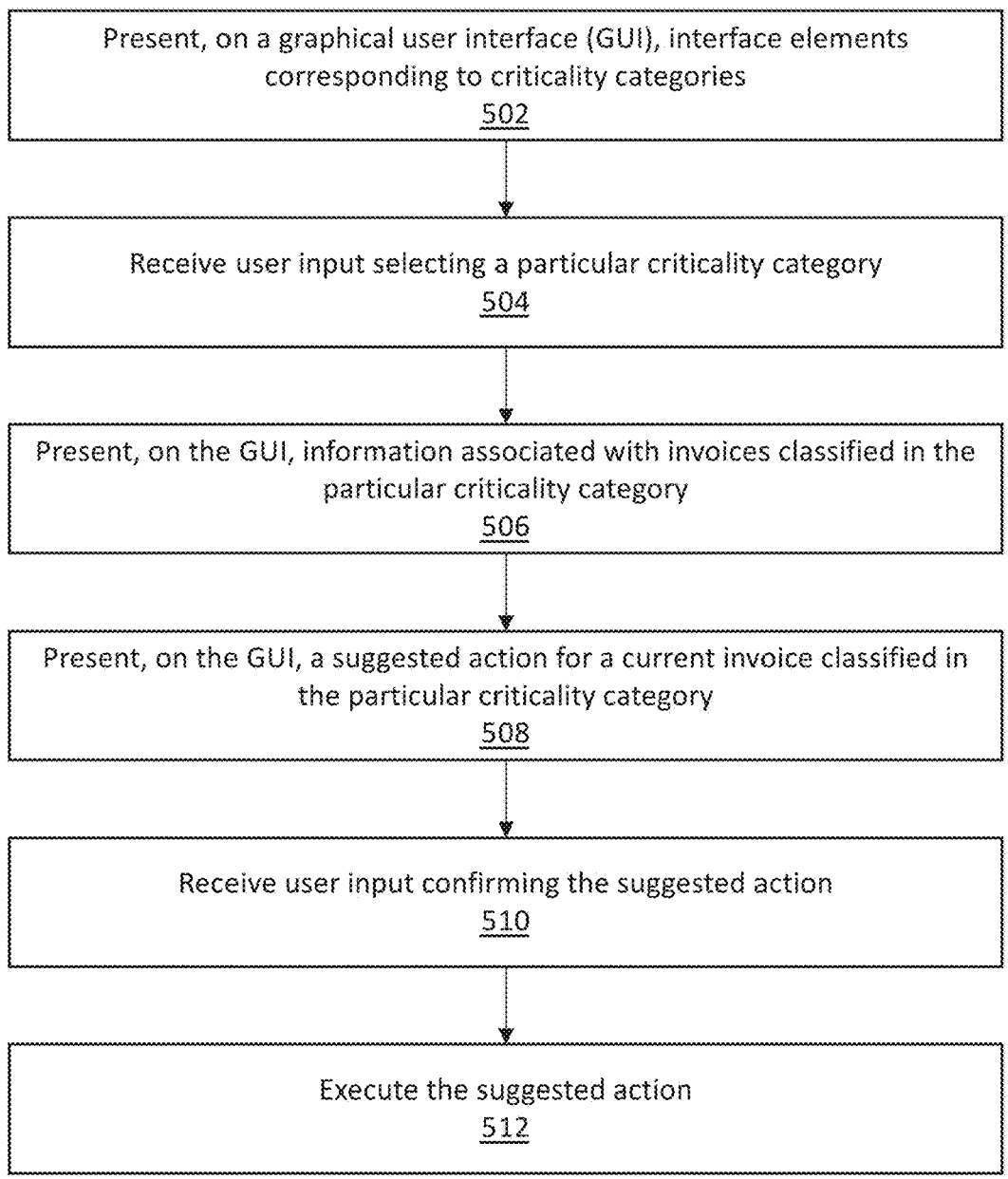
FIG. 5 illustrates an example set of operations for presenting, at a graphical user interface (GUI), criticality information for a current invoice, in accordance with one or more embodiments.

6. Presenting, at a Graphical User Interface (GUI), Criticality Information for One or More Invoices FIG. 5 illustrates an example set of operations for presenting, at a graphical user interface (GUI), criticality information for a current invoice, in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

One or more embodiments include presenting, on a GUI, interface elements corresponding to criticality categories (Operation 502). An invoice management system presents, on a GUI, interface elements corresponding to criticality categories. The system may concurrently present information associated with each criticality category, such as the number of invoices classified in each criticality category. Each interface element is selectable to request additional information regarding invoices classified within the corresponding criticality category.

As an example, a system may present, on a GUI, a box including three lines of text: "High Criticality," "Medium Criticality," and "Low Criticality." Each line of text is an interface element corresponding to a respective criticality category. Next to "High Criticality" may be the number "3," indicating 3 invoices are classified in the criticality category. Next to "Medium Criticality" may be the number "5," indicating 5 invoices are classified in the criticality category. Next to "Low Criticality" may be the number "10," indicating 10 invoices are classified in the criticality category.

One or more embodiments include receiving user input selecting a particular criticality category (Operation 504). The system receives, via the GUI, user input selecting a particular criticality category. As an example, a user may click on an interface element corresponding to a particular criticality category.

One or more embodiments include presenting, on the GUI, information associated with invoices classified in the particular criticality category (Operation 506). In response to the user selection of the particular criticality category, the system identifies invoices classified in the particular criticality category, based on current criticality values associated with the invoices. The system presents information associated with invoices classified in the particular criticality category. The system may present, for example, a list of invoices classified in the particular criticality category. The system may present an invoice number, a supplier, and an amount due, for each invoice classified in the particular criticality category.

One or more embodiments include presenting, on the GUI, a suggested action for a current invoice classified in the particular criticality category (Operation 508). The system determines one or more suggested actions for a current invoice based on (a) a predicted hold for the current invoice and/or (b) a current and/or impending processing stage of the current invoice.

In an embodiment, the system obtains a set of rules for determining a predicted hold on the current invoice. Examples of operations for generating the set of rules are described above with reference to Operation 308 of FIG. 3. The system applies the set of rules to the invoice characteristics of the current invoice to determine a probability or likelihood that a particular hold will occur. If the probability is above a threshold value, then the system determines that the particular hold is a "predicted hold" for the current invoice.

The system determines a suggested action in response to the predicted hold. The suggested action may be specified via user input and/or by an application. Additionally or alternatively, the suggested action may be determined heuristically based on historical information.

In an embodiment, the system determines a current processing stage of the current invoice. The system determines a suggested action based on the current processing stage. Additionally or alternatively, the system determines a suggested action based on an impending processing stage of the current invoice. The suggested action may be specified via user input and/or by an application. Additionally or alternatively, the suggested action may be determined heuristically based on historical information.

Hence, the system presents, on the GUI, one or more suggested actions for the current invoice. The GUI may include interface elements describing the suggested action.

One or more embodiments include receiving user input confirming the suggested action (Operation 510). The system receives, via the GUI, a user input confirming the suggested action. As an example, a user may click on an interface element corresponding to a suggested action.

In one or more embodiments, Operation 510 is not performed. Subsequent to determining a suggested action, the system performs Operation 512 to execute the suggested action without user interaction. As an example, a system may determine whether a criticality value associated with a current invoice is above a threshold value. If the criticality value is above the threshold value, the system may determine and execute a suggested action without user interaction. If the criticality value is below the threshold value, the system may display a suggested action on a GUI. The system may execute the suggested action only after user confirmation of the suggested action.

One or more embodiments include executing the suggested action (Operation 512). In response to the user confirmation of the suggested action, the system executes the suggested action.

In an embodiment, the suggested action for the current invoice (which has not yet entered the approval stage) includes sending an approval request to an approver for the current invoice. The system causes an email including the approval request to be sent to the approver. In response to the approval request, the approver may begin reviewing the current invoice.

In an embodiment, the suggested action for the current invoice (which is currently in the approval stage) includes sending a reminder on an approval request to an approver for the current invoice. The system causes a landing page of the invoice management software that is displayed to the approver to include a notification reminding the approver about the approval request.

In an embodiment, the suggested action includes verifying the amount due on the current invoice matches the amount due on a purchase order matched with the current invoice. The system identifies the purchase order matched with the current invoice. The system compares the two amounts due. The system generates a result indicating whether the two amounts due are within a certain tolerance.

In an embodiment, the suggested action includes converting an amount due on the current invoice from one currency to another currency. The system causes transmission of a conversion request to a financial institution. In response to the conversion request, the financial institution may begin a process for currency conversion.

In an embodiment, the suggested action includes requesting more details about the items on the current invoice from the supplier. The system causes an email including the information request to be sent to the supplier. In response to the information request, the supplier may transmit an email including the details about the items on the current invoice.

In an embodiment, the suggested action includes verifying that the items on the current invoices were actually received by the organization. Additionally or alternatively, the suggested action includes verifying the items on the current invoice were received in a good condition. The system causes a verification request to be sent to a receiving department of the organization. In response to the verification request, the receiving department, which is responsible for receiving shipments for the organization, may perform the verification.

Additional and/or alternative suggested actions may be used.

7. Example Graphical User Interfaces

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 6:
FIG. 6 illustrates an example graphical user interface indicating criticality categories and associated information, in accordance with one or more embodiments.

FIG. 6 illustrates an example graphical user interface indicating criticality categories and associated information, in accordance with one or more embodiments.

As illustrated, screenshot 600 is a dashboard for an accounts payable manager. The dashboard includes, for example, the number of invoices that have been scanned into the system during a certain time period, the number of invoices in each processing stage that are currently experiencing a hold, and the number of invoices in each criticality category.

As illustrated, interface element 602 indicates that there are 3 invoices in the "High" criticality category. Interface element 604 indicates that there are 23 invoices in the "Medium" criticality category. Interface element 606 indicates that there are 189 invoices in the "Low" criticality category. Each interface element 602-606 is selectable to request a list of invoices within the corresponding criticality category.

As illustrated, interface element 602 has been selected. A table 608 displays a list of invoices within the "High" criticality category. The table 608 includes the fields: Invoice Number, Amount Due, Supplier, Validation Status, Approval Status, and Paid Status. Validation Status indicates a status associated with a validation stage. Validation Status indicates a status associated with an approval stage. Paid Status indicates a status associated with a payment stage. A respective interface element associated with each invoice is selectable to request additional details regarding the invoice.

FIG. 7 illustrates an example graphical user interface indicating a status associated with a particular invoice, in accordance with one or more embodiments.

As illustrated, screenshot 700 displays detailed information regarding a particular invoice. Basic information 718 includes, for example, an amount due, a currency type, a supplier, a supplier location, a creation date, a last updated date, a business unit, and a purchase order number (if any).

Status pane 714 includes information on various statuses associated with the invoice.

The status of each processing stage is shown. Element 702 displays a validation status, indicating that the validation stage has been completed. Element 704 displays an approval status, indicating that one approval is still missing. Element 706 displays a paid status, indicating that the invoice has not yet been paid.

The status of each actual and/or predicted hold is shown. Element 708 indicates that a number of resolved holds for the invoice is 2. Element 710 indicates that a number of actual pending holds for the invoice is 0. Element 712 indicates that a number of predicted holds for the invoice is 1.

Interface elements 702-706 may be selectable to request a suggested action that is appropriate for the corresponding processing stage. Additionally or alternatively, interface elements 708-712 may be selectable to request a suggested action that is appropriate for a resolving and/or addressing a corresponding hold.

Status pane 714 further shows the criticality category of the invoice, the predicted processing time for the invoice, and the due date for the invoice.

Table 716 includes information regarding each line of the invoice. Table 716 includes the fields: Line Number, Item, Unit Price, Units, Total, and Description. As an example, Line 1 may indicate that 7 units of "Tuna" were purchased at $2.31 per unit for a total of $16.17. A description of the item may be "Pacific tuna."

Figure 8:
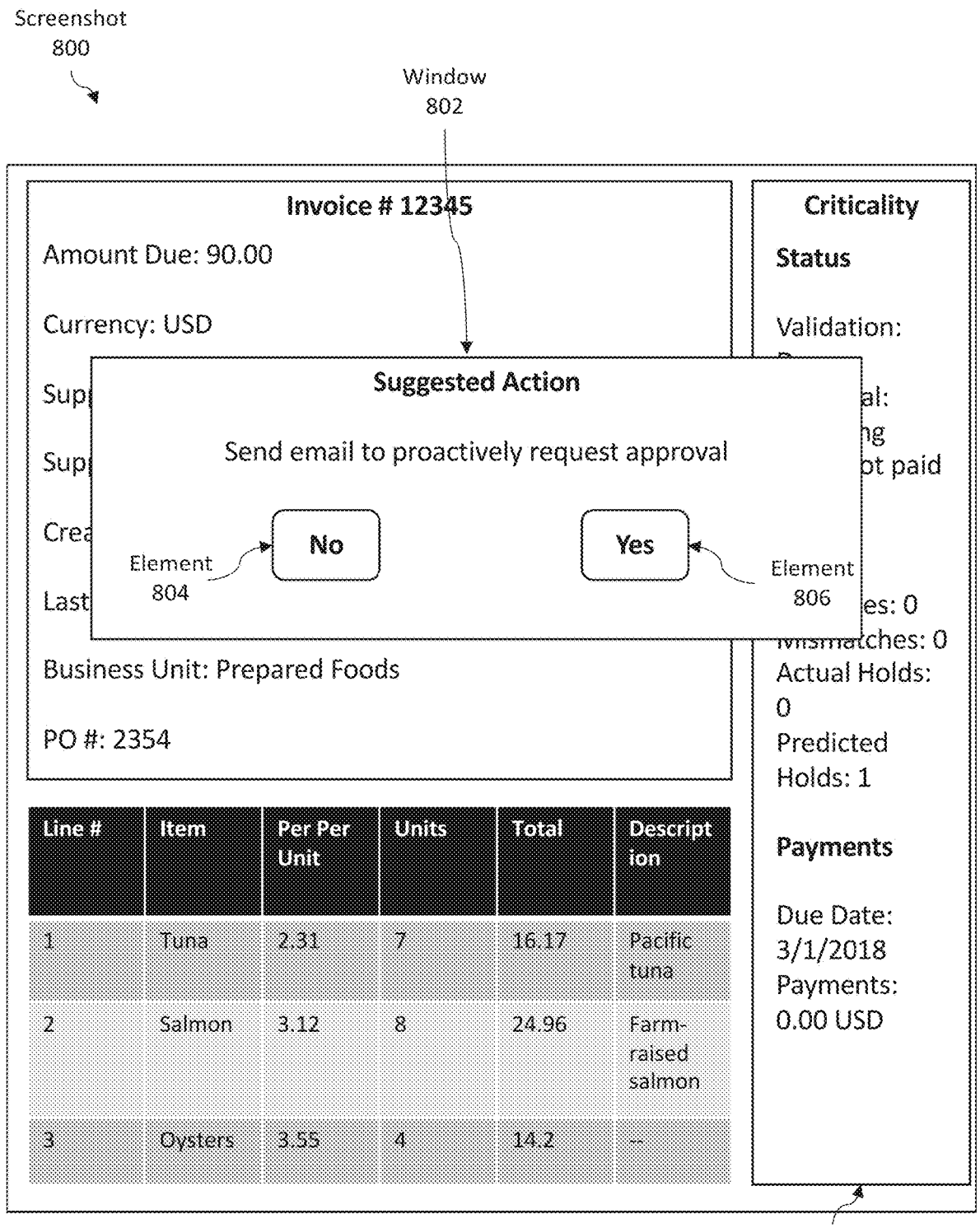
FIG. 8 illustrates an example graphical user interface indicating a suggested action associated with a particular invoice, in accordance with one or more embodiments.

FIG. 8 illustrates an example graphical user interface indicating a suggested action associated with a particular invoice, in accordance with one or more embodiments.

As illustrated, screenshot 800 displays a suggested action for a particular invoice. In response to a user selection of an interface element within status pane 814, window 802 is displayed. Window 802 includes a suggested action: "Send email to proactively request approval." Window 802 includes interface element 806, for confirming the suggested action, and interface element 804, for rejecting the suggested action.

Figure 9:
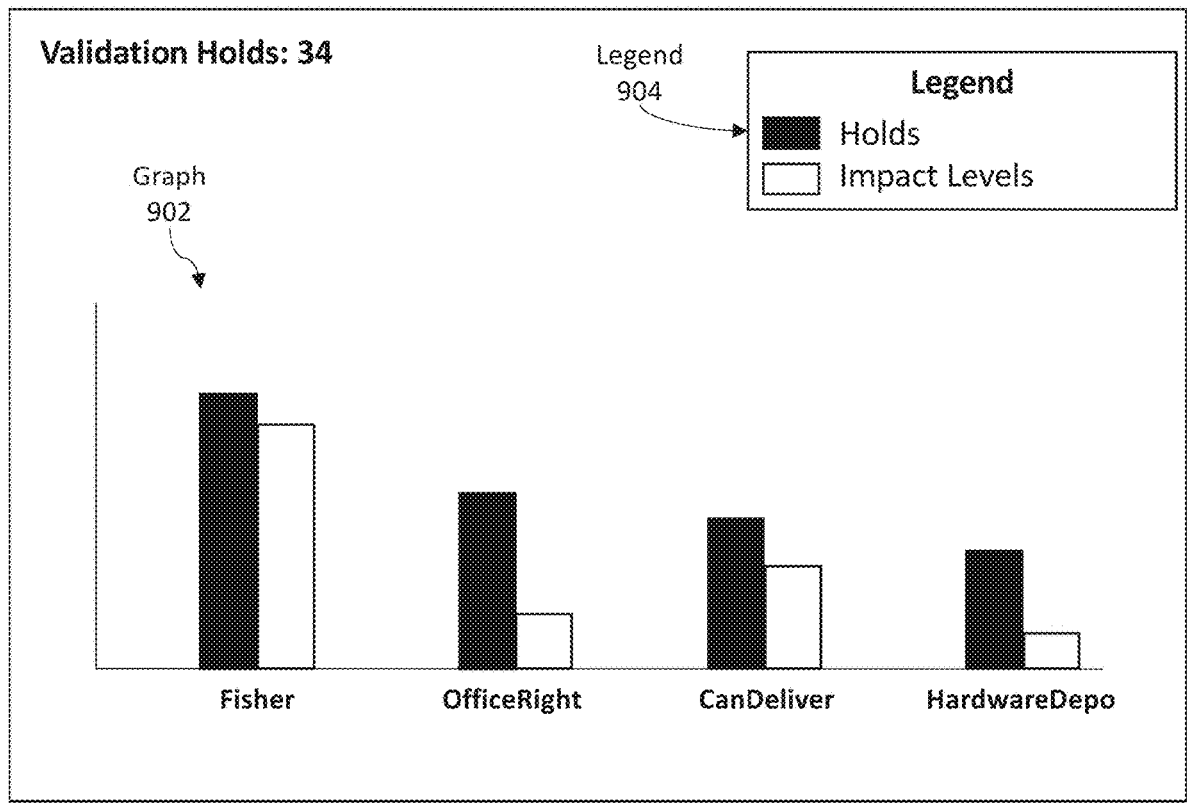
FIG. 9 illustrates an example graphical user interface indicating information associated with the processing of invoices, grouped by supplier, in accordance with one or more embodiments.

FIG. 9 illustrates an example graphical user interface indicating information associated with the processing of invoices, grouped by supplier, in accordance with one or more embodiments.

A system determines a set of invoices to be analyzed. The invoices may be invoices that have been paid within a certain time period (such as, within the past 30 days).

The system breaks down the set of invoices by supplier. The suppliers include Fisher, OfficeRight, CanDeliver, and HardwareDepo.

The system determines that invoices from Fisher experienced 15 validation holds; invoices from OfficeRight experienced 9 validation holds; invoices from CanDeliver experienced 6 validation holds; and invoices from HardwareDepo experienced 4 validation holds. The system determines that the set of invoices experienced a total of 34 validation holds.

Further, the system determines that a total impact level associated with the invoices from Fisher is 10; a total impact level associated with the invoices from OfficeRight is 2; a total impact level associated with the invoices from CanDeliver is 5; and a total impact level associated with the invoices from HardwareDepo is 1.

The system presents graph 902 and legend 904 at screenshot 900. Graph 902 indicates correlations and/or relationships between holds, impact levels, and suppliers. As illustrated, graph 902 includes two bars per supplier. One bar represents the number of validation holds associated with a supplier; another bar represents the impact level associated with the supplier.

Based on graph 902, a user may easily see correlations and/or relationships between holds, impact levels, and suppliers.

The user may determine that Fisher is associated with a number of validation holds that far exceeds the validation holds associated with the other suppliers. The user may analyze invoices and/or other interactions with Fisher to determine whether there is a systematic problem associated with invoices from Fisher. Hence, the user may address problems at a global level, rather than addressing each invoice one by one as individual problems arise.

The user may determine that OfficeRight is associated with a greater number of validation holds than CanDeliver. However, the impact level associated with CanDeliver is greater than the impact level associated with OfficeRight. Hence, even though OfficeRight is associated with more holds, the user may prioritize resolving issues associated with CanDeliver, in order to reduce the impact experienced by the organization.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
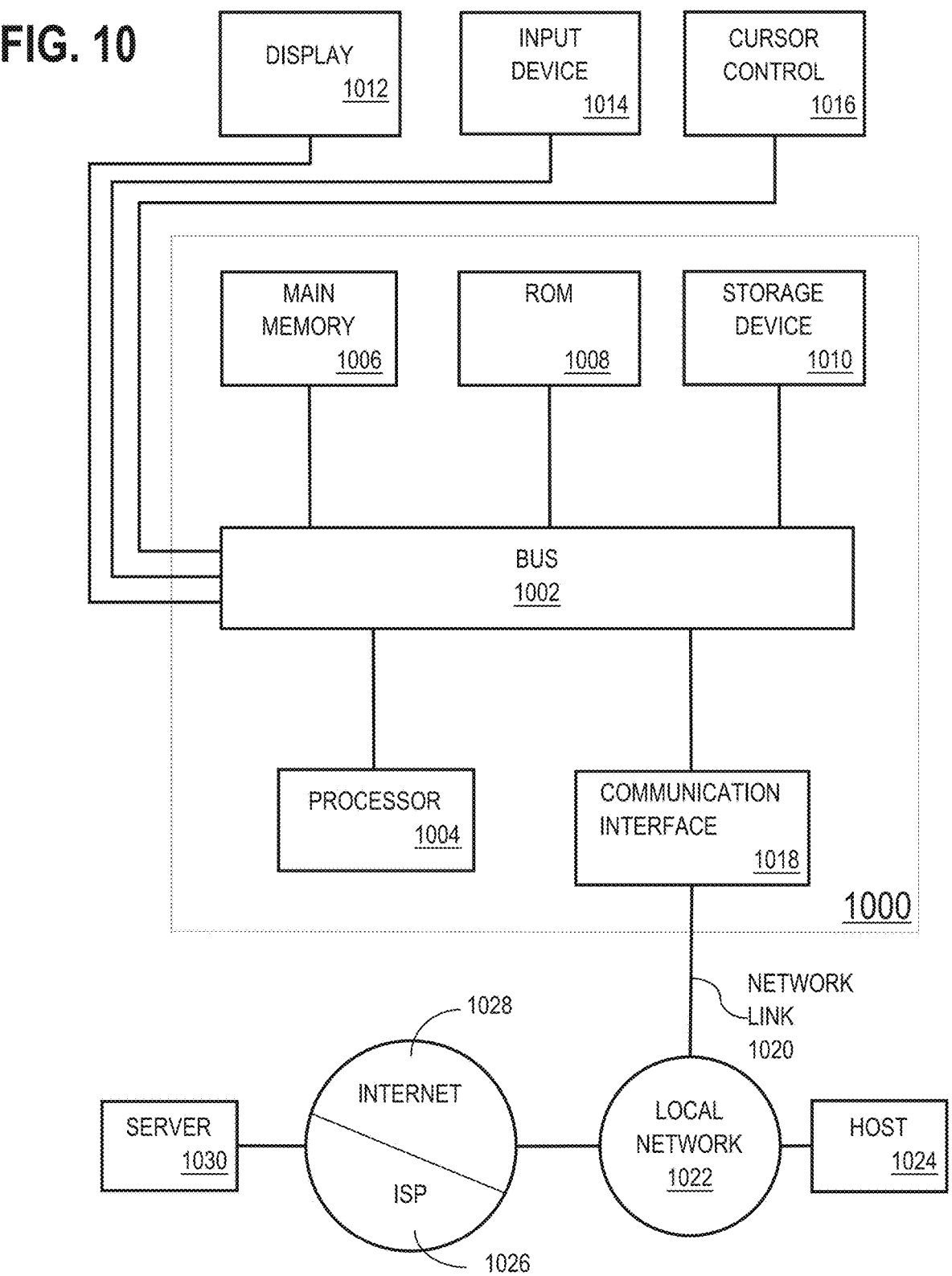
FIG. 10 shows a block diagram that illustrates a computer system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   performing machine learning on invoice characteristics and invoice processing times associated with a plurality of invoices, to obtain one or more rules for predicting invoice processing times;
   applying the one or more rules to invoice characteristics associated with a particular invoice, to determine a predicted amount of time for completing processing of the particular invoice, wherein the predicted amount of time for completing processing of the particular invoice is determined based on at least (a) a first predicted processing time for a validation stage, (b) a second predicted processing time for an approval stage, and (c) a third predicted processing time for a payment stage;

presenting, on a Graphical User Interface (GUI), a plurality of interface elements respectively corresponding to a plurality of criticality categories, wherein the plurality of criticality categories respectively correspond to ranges of criticality values;

receiving, via the GUI, a user selection of a particular criticality category of the plurality of criticality categories;

in response to the user selection of the particular criticality category: presenting, on the GUI, information associated with a set of one or more invoices associated with the particular criticality category, the set of one or more invoices comprising the particular invoice;

wherein the particular invoice, of the set of invoices, is determined to be associated with a first criticality value within the particular criticality category based on at least a difference between (a) the predicted amount of time for completing processing of the particular invoice, as determined by applying the one or more rules to the invoice characteristics associated with the particular invoice, and (b) an amount of time currently remaining until a target completion date for processing of the particular invoice;

wherein a second invoice, of the set of invoices, is determined to be associated with a second criticality value within the particular criticality category based at least on a difference between (a) a predicted amount of time for completing processing of the second invoice, as determined by applying the one or more rules to invoice characteristics associated with the second invoice, and (b) an amount of time currently remaining until a target completion date for processing of the second invoice;

determining whether the first criticality value is above a threshold value;

responsive at least to determining that the first criticality value is not above the threshold value:

presenting, on the GUI, an interface element configured to receive user confirmation to execute a first suggested action for the particular invoice;

determining whether the second criticality value is above the threshold value;

responsive at least to determining that the second criticality value is above the threshold value:

executing a second suggested action for the second invoice, without receiving user confirmation via the GUI to execute the second suggested action, the second suggested action being aimed at reducing processing time for the second invoice.

2. The one or more media of claim 1, wherein the particular invoice, of the set of invoices, is determined to be within the particular criticality category based on at least a supplier type of a supplier for the particular invoice.

3. The one or more media of claim 1, wherein the particular invoice, of the set of invoices, is determined to be within the particular criticality category based on at least an item type of an item listed on the particular invoice.

4. The one or more media of claim 1, wherein the particular invoice, of the set of invoices, is determined to be within the particular criticality category based on at least a predicted impact resulting from missing the target completion date for the particular invoice.

5. The one or more media of claim 1, wherein the predicted amount of time for processing the particular invoice is determined based on at least whether the particular invoice is a matched invoice or an unmatched invoice.

6. The one or more media of claim 1, wherein the predicted amount of time for processing the particular invoice is determined based on at least a hold type of a predicted hold for the particular invoice.

7. The one or more media of claim 1, wherein the predicted amount of time for processing the particular invoice is determined based on at least an amount due of the particular invoice.

8. The one or more media of claim 1, wherein the predicted amount of time for processing the particular invoice is determined based on at least a number of approvers required for the particular invoice.

9. The one or more media of claim 1, wherein the predicted amount of time for processing the particular invoice is determined based on at least an identity of an approver required for the particular invoice.

10. The one or more media of claim 1, wherein the predicted amount of time for processing the particular invoice is determined based on at least a currency type for making payment on the particular invoice.

11. The one or more media of claim 1, wherein the information associated with the set of invoices comprises: a listing of the set of invoices.

12. The one or more media of claim 11, wherein the set of invoices are displayed on the GUI according to an ordering determined based on invoice criticality information associated with the set of invoices.

13. The one or more media of claim 1, further storing instructions which, when executed by one or more processors, cause:

presenting, on the GUI, an interface element associated with the particular invoice that is selectable to initiate an action that addresses a predicted hold for the particular invoice.

14. The one or more media of claim 1, further storing instructions which, when executed by one or more processors, cause:

presenting, on the GUI, an interface element associated with the particular invoice that is selectable to initiate an action associated with a current processing stage for the particular invoice.

15. The one or more media of claim 1, further storing instructions which, when executed by one or more processors, cause:

presenting, on the GUI, an interface element indicating an action associated with the particular invoice;

in response to a user confirmation of the action: executing the action.

16. The one or more media of claim 1, further storing instructions which, when executed by one or more processors, cause:

determining an action associated with the particular action;

responsive to determining that a criticality value associated with the particular invoice is above a threshold value: executing the action without user interaction.

17. The one or more media of claim 1, wherein the set of one or more rules comprises an artificial neural network.

* * * * *